March 9, 1965  C. L. ABERGE ETAL  3,172,214
EDUCATIONAL DEVICE
Filed Oct. 4, 1961  2 Sheets-Sheet 2

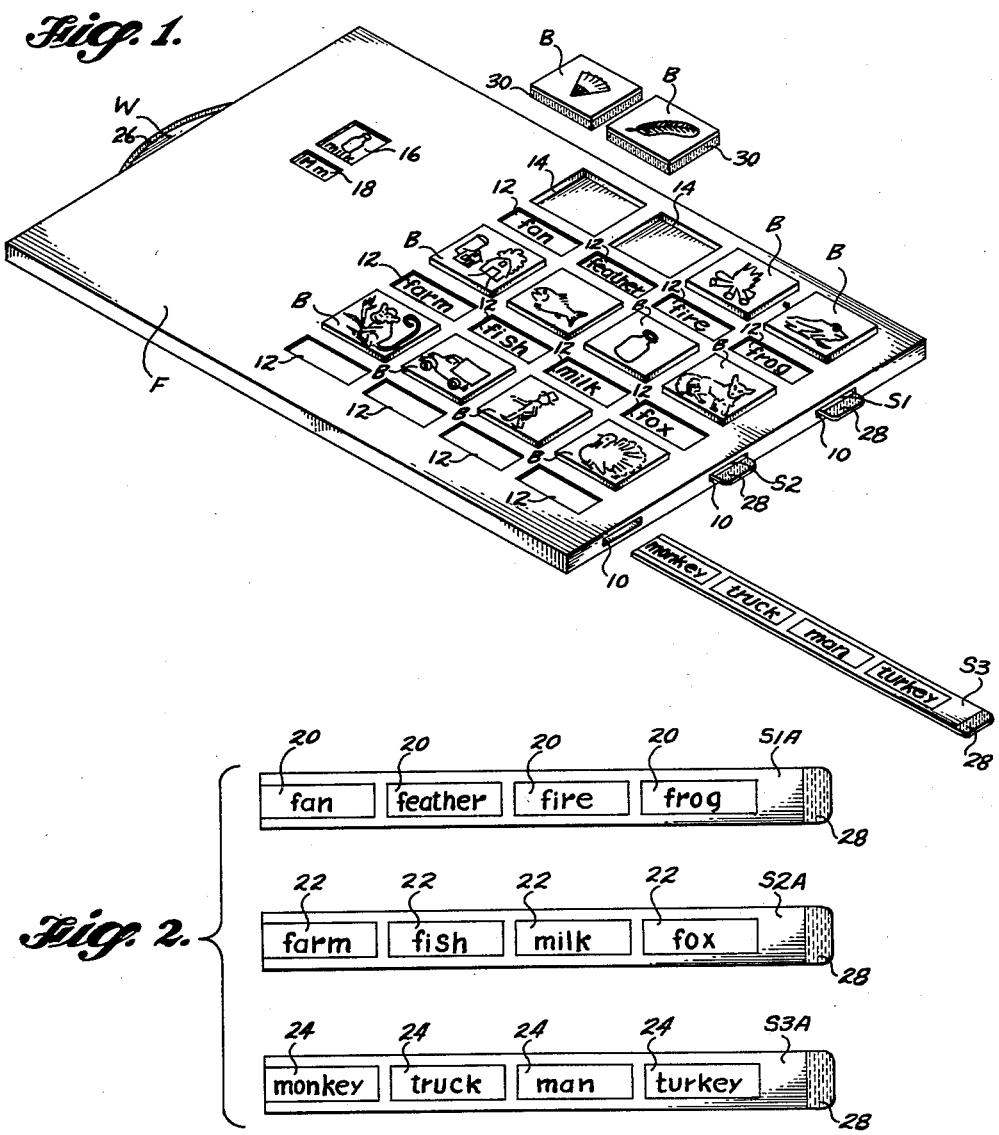

INVENTOR.
CARROLL L. ABERGE
KEITH D. SULLENGER
BY Mathis and Graybeal
ATTORNEYS

United States Patent Office 3,172,214
Patented Mar. 9, 1965

3,172,214
EDUCATIONAL DEVICE
Carroll L. Aberge, 2527 72nd St. SE., Mercer Island, Wash., and Keith D. Sullenger, Bingham Canyon, Utah; said Sullenger assignor to said Aberge
Filed Oct. 4, 1961, Ser. No. 142,979
12 Claims. (Cl. 35—8)

The present invention relates to educational devices of the question-answer matching type, such as for training in the development of word-image and like associations and comparisons. One important application of such devices is for training of pre-school and primary grade children in development of sight vocabulary and word recognition faculties, for example.

Objects, advantages and features of the invention include the provision of an educational device for rapid training of children as to common word-image associations, as for teaching of word forms, for teaching similarities and differences in words, for teaching meanings of words and recognition of words, for teaching the configuration of words, for teaching of the meaning of printed words by associating the printed words with visual images such as pictorial representations, and for teaching the association of visual images and words by permitting the child to repeatedly view, handle, and compare the images and associated words. Other features and advantages of devices according to the present invention include their wide versatility as to the pattern of presentation to the child of question symbols such as words for association with accompanying answers such as visual images, the provision of an answer identification means which is normally concealed but can be selected by the teacher or child as necessary, the provision of a number of answers on easily handleable blocks for association with presented questions, by means of which the pupil can physically manipulate the visual image and thereby develop a better memory association of the image and corresponding word. Additionally, and quite importantly to the effectiveness of the device in teaching question-answer associations, the device comprises a plurality of removable, reversible and interchangeable question strips, each presenting a plurality of question symbols in different order on one side than on the other side. As will be more apparent from the following specific consideration of a typical embodiment of the invention, such question symbol strips enable the teacher to present any given question symbol in any of various rows and columns of the device as provided for associated placement of answer blocks. With such provision for "randomness" as to the location of any particular question symbol to be matched with a particular answer, the problem of the pupil learning the location of a question symbol rather than the question symbol itself is avoided.

As a related feature of the invention, such removable, reversible and interchangeable question strips are used in conjunction with a removable and rotatable identification or reminder wheel carrying corresponding questions and answers so a child can have available a check of the proper question symbol to correctly associate with any given answer symbol. Important with respect to the versatility of the device is the proposition that the question symbol bearing strips and associated identification wheels can be available in several sets, for variety and to increase the number and scope of question-answer associations which can be taught by the device.

Constructional aspects of the device by which such is adapted especially for use by small children include the utilization of raised blocks which are easy for children to place and remove, and use of simple, easily recognizable answer symbols such as visual images, as well as use of question presentations in manuscript style, it having been found that small children learning to read recognize words printed in manuscript style more readily than words printed in other styles.

These and other objects, features and advantages of the invention will be apparent from the following description and accompanying illustration of a typical embodiment thereof, wherein like numerals and letters refer to like parts, and wherein:

FIG. 1 is an isometric view, with certain parts shown in exploded relation, of an educational device typifying the invention;

FIG. 2 is a front plan view of the word strips of the device shown in FIG. 1;

Figure 5:
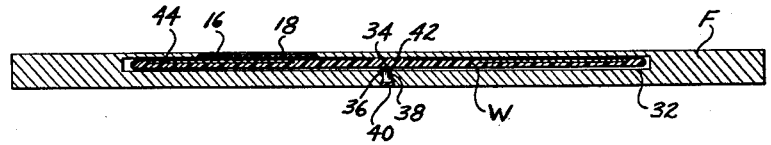
Figure 6:
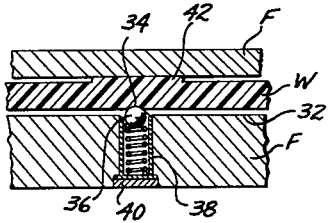

FIG. 5 is a view in lateral cross section taken diametrically through the identification wheel of the device shown in FIG. 1, and on a somewhat enlarged scale; and FIG. 6 is a fragmentary, cross sectional view on a further enlarged scale, showing the spring loaded ball mechanism for rotatably retaining yet permitting ready insertion or removal of a given identification wheel in and out of the frame of the device.

As shown in the accompanying illustrations, the vocabulary and reading training device comprises a board or frame F, a plurality of question strips or slats S1, S2, S3, and an identification or "self-check" wheel W, together with a plurality of answer blocks B. For purposes of typical illustration, the question symbols presented by strips S1, S2, S3 are each in the form of a printed word, and the answer symbols on blocks B are each in the form of a pictorial representation, each matchable with one of the question word symbols. Also, simply by way of example, the question strips are shown as being three in number, with four question panels on each side of each strip, so that a total of twelve question symbols is presented to the child to be matched with twelve associated answer blocks B.

Frame F is provided with three slide receiving slots 10 which open along an edge of said frame F, the said slots 10 each having associated therewith four question displaying windows 12, which may either be simply open or covered with a transparent material such as a clear plastic, as desired. Above each of windows 12, and recessed into frame F is a pocket 14 dimensioned to snugly receive any of blocks B to the extent of most but not all of the thickness of a block B, so that when said blocks B are placed in pockets 14 they are disposed with their answer displaying surfaces substantially above the face of frame F, such arrangement of raised blocks permitting the child to readily grasp and remove any given block B from any given pocket 14, as desired.

Figure 4:
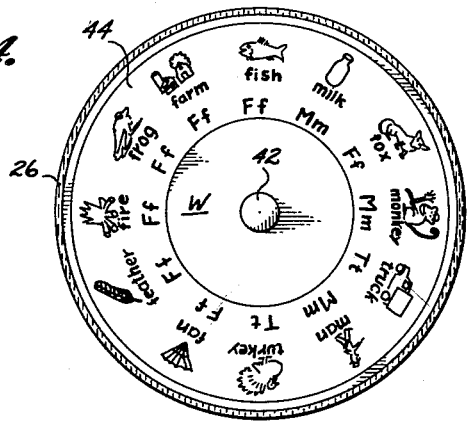
FIG. 4 is a plan view of the identification wheel of the device shown in FIG. 1, as it appears when removed.

As best shown in FIG. 4, the identification wheel W bears a circular arrangement of the various pictorial answers presented by blocks B, together with the various word symbol questions presented by slides S1, S2, S3, and preferably but not necessarily also bears a presentation of the first letter of each word symbol question in capital form and in small case or manuscript form. To display any selected question and answer pair, and associated letters, frame F is provided with a window 16 through which any particular pair of question and answer symbols may be viewed by rotation of wheel W with respect to frame F, and also has a smaller window 18 through which the corresponding letter displays can be viewed. With respect to the embodiment of the invention illustrated, the presentation provided by the separate capitalized and small case letters appearing at window 18 has been found advantageous for word teaching purposes in that a child will often first learn the first letter of a word and can scan the wheel W for the proper word by looking either for the first letter thereof in window 18 or for the visual image thereof in window 16.

Figure 3:
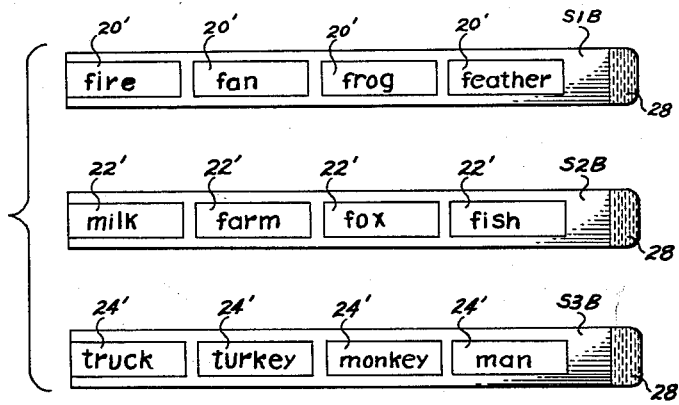
FIG. 3 is a rear plan view of the word strips shown in FIG. 2.

In order to enable a variable pattern of question symbol presentation, each of strips S1, S2, S3 presents a series of question symbol forms on separate panels 20, 22, 24 thereof, respectively, on one side of the strips, as respectively designated S1A, S2A, S3A, in FIG. 2. Also, said strips S1, S2, S3 present respective question symbol bearing panels 20', 22', 24', on the other respective sides S1B, S2B, S3B thereof, as shown at FIG. 3, the order of the question symbol forms appearing at the sets of panels 20, 22, 24 and the sets of panels 20', 22', 24', being different. As will be apparent, any of the strips S1, S2, S3 can be placed in any of slots 10 of frame F with either side of each displayed under windows 12, so that any given question symbol form can be made to appear in any row, and in either of two columns, of the windows 12.

It is an important practical feature of the educational device shown that the removable wheel W, the removable strips S1, S2, S3, and the removable blocks B constitute a set which is readily interchangeable with another set displaying different visual images and different word forms. For example, in a type of the device now in use, some ten strips-blocks-wheel sets are included, providing an availability of a total of one hundred twenty separate question-answer associations. For ready identification, each such strips-blocks-wheel set is color-coded with an easily recognizable, distinctive color, such color coding being shown as purple in the accompanying illustrations for ease of illustration, which color coding suitably appears on the rim of wheel W as indicated at 26, on both sides of the tips of the strips S1, S2, S3 as indicated at 28, and on the backs and at least a portion of the sides of the accompanying visual image blocks B, as indicated at 30 in two instances in FIG. 1.

FIGS. 5 and 6 serve to show further detail with respect to the identification wheel W and the arrangement thereof so as to be insertable and rotatable in, and removable from frame F, as desired. Slot 32 in frame F extends from the side of frame F to a width and depth therein sufficient to accommodate the wheel W to the extent that only peripheral segment of wheel W extends beyond the edge of frame F to permit rotation of the wheel W. When installed, a slight hemispherical recess or indent 34 on the bottom of wheel W is engaged by the spring loaded ball 36 of a detent cartridge 38, which is suitably positioned to extend slightly into the area of slot 32 from the bottom side of frame F, and be there retained, as by friction fitting and an adhesive or bonding seal 40. As will be understood, the spring loading of ball member 36 is such that it will yield to permit insertion and withdrawal of wheel W to and from slot 32, and when recess 34 of the wheel is seated on ball member 36, the wheel is readily rotatable within the slot 32 so as to place any desired question and answer pair, with the accompanying letter forms, in view under windows 16 and 18. To facilitate rotational movement of the wheel W with respect to frame F, the center portion of the upper side of wheel W is preferably slightly thicker, as indicated at 42, to provide a relatively small friction surface between the uppersurface of slot 32 and the upper surface of wheel W, and avoid scraping of the printed panel 44 presenting the various question, answer and letter forms.

As to the manner of construction of the illustrated device, all parts thereof can be formed of any suitable material such as wood or plastic. One practical way of fabricating the frame F is by molding the frame in upper and lower halves with recesses for forming the slots 10 and 32, then bonding clear plastic panels and strips to the underside of the upper half to cover the various windows 12, 16, 18, and then adhesively or otherwise bonding the two frame halves together to make the completed frame. As will be understood, many variations are possible with respect to the constructional material involved, and as to the layout or pattern of the various windows 12, pockets 14, and strip receiving slots 10, as well as to the orientation of the windows 12 and pockets 14 with respect to the location of the wheel W. Thus, by way of typical further example, the wheel W and an associated viewing window or windows can be placed generally centrally of the board, with the wheel access slot 32 opening either on the top or bottom edge of the frame and with the pattern of windows 12 and pockets 14 being arranged on both sides of the wheel W, with the various strip receiving slots 10 arranged to extend either horizontally or vertically.

Other versions of the device can also involve placement of symbol patterns on both sides of blocks B and/or on both sides of wheel W. With respect to the variation in the question symbol pattern, it will also be seen that the number of rows and columns of question displaying windows can be varied as desired, and that the pattern of question symbols on each slide can be arranged and associated with the windows so that a different question order is presented by reversing the slides end-for-end as well as top-for-bottom. In this variation, of course, two reversely facing offset rows of question symbols appear on each side of each slide and the question display windows display one row of symbols at a time, so that four pattern variations are available per slide.

While the invention has been primarily described with respect to teaching associations of questions in the form of printed words and answers in the form of pictorial representations, it will also be understood that the basic proposition as to reversible and interchangeable strips to avoid question identification by location, as well as the proposition of a rotatable and removable reminder wheel associated with a set of such reversible and interchangeable strips, is applicable to various other types of question-answer pairs, such as where the question symbol is a pictorial representation or other visual image and the answer is a printed word, such as where the question and answer symbols are both pictorially presented or both printed words, phrases, or sentences, and such as where both are words to be related by like prefixes or like suffixes or like situations (e.g. farm words), or like geographical relation (e.g. states and capitols), or are other associatable symbols (e.g. arithmetic relations), for example.

From the foregoing, various further adaptations, modifications, and arrangements of matching components, as well as features and advantages of the device for various teaching applications, will be apparent to those skilled in the art to which the invention is addressed, within the scope of the following claims.

What is claimed is:

1. An educational device for question-answer matching; comprising a frame with a plurality of slide receiving slots opening along an edge of said frame; a plurality of question viewing windows over each of said slots; an answer block receiving pocket disposed in association with each of said windows; a set of question slides insertable in and removable from said slots, with a plurality of question symbols appearing on said slides at locations to display a question symbol at each slot window when the slide is fully inserted in a slot; a set of answer bearing blocks removably insertable in any of the said frame pockets, each of such blocks having a different answer from the others, which answers collectively correspond to the questions collectively presented by the set of slides, the said slides being interchangeable in said slots so that the questions presented on any slide can be placed in any row of slot windows and thereby avoid any tendency for a user of the device to associate a given answer block with a given location on the frame when the questions and answers are compared and the answer blocks placed in pockets of the frame corresponding to the questions presented by the slides.

2. An educational device according to claim 1, wherein said question slides bear a plurality of separate word forms, and each of said answer blocks bears a visual image to be associated with one of said word forms.

3. An educational device according to claim 1, further comprising a rotatable and removable identification wheel bearing in sector pattern the plurality of questions and answers presented by said slides and said blocks, any given question and the corresponding answer being displayable through a window in said frame by rotation of said wheel about its center axis.

4. An educational device according to claim 3, wherein the outer tips of said slides, the backs of said blocks, and the rim of said wheel are the same color to constitute a color-coded set.

5. An educational device according to claim 4, comprising a plurality of interchangeable sets of question slides, answer blocks, and identification wheels, each such set being color-coded with a color different than the color-coding of the other sets.

6. An educational device according to claim 3, wherein said identification wheel is provided with an indent coincident with its center axis at one side thereof, and said frame comprises a spring loaded ball member engageable with said indent.

7. An educational device for question-answer matching such as for word-image and like associations, comprising in combination; a rigid frame with a plurality of slide receiving slots opening along an edge of said frame; a plurality of question viewing windows over each of said slots; an answer block receiving pocket disposed in association with each of said windows; a set of question slides insertable in and removable from said slots, with a plurality of question symbols appearing on both sides of said slides at locations to display a question symbol at each slot window when the slide is fully inserted in a slot, the question symbols on one side of each slide being in different order than the order of the question symbols on the reverse side thereof; a set of answer bearing blocks removably insertable in any of the said frame pockets, each of such blocks having a different answer from the others, which answers collectively correspond to the questions collectively presented by the set of slides on one side thereof, the said slides being reversible top-for-bottom and being interchangeable in said slots so that the questions presented on any side of any slide can be placed in any row of slot windows and differently in order in a row, and thereby avoid any tendency for a user of the device to associate a given answer block with a given location on the frame when the questions and answers are compared and the answer blocks placed in pockets of the frame corresponding to the questions presented by the slides.

8. An educational device according to claim 7, wherein said question slides bear a plurality of separate word forms, and each of said answer blocks bears a visual image to be associated with one of said word forms.

9. An educational device according to claim 7, further comprising a rotatable and removable identification wheel bearing in sector pattern the plurality of questions and answers presented by said slides and said blocks, any given question and the corresponding answer being displayable through a window in said frame by rotation of said wheel about its center axis.

10. An educational device according to claim 9, wherein the outer tips of said slides, the backs of said blocks, and the rim of said wheel are the same color to constitute a color-coded set.

11. An educational device according to claim 10, comprising a plurality of interchangeable sets of question slides, answer blocks, and identification wheels, each such set being color-coded with a color different than the color-coding of the other sets.

12. An educational device according to claim 9, wherein said identification wheel is provided with a recess coincident with its center axis at one side thereof, and said frame comprises a spring loaded ball member engageable with said recess.

References Cited in the file of this patent

UNITED STATES PATENTS

| | | |
|---|---|---|
| 1,816,760 | Barnowitz | July 28, 1931 |
| 2,645,038 | Merrill | July 14, 1953 |
| 2,900,742 | Barker et al. | Aug. 25, 1959 |
| 2,932,909 | Bosco | Apr. 19, 1960 |
| 2,959,872 | Rogers | Nov. 15, 1960 |
| 2,996,813 | Taylor | Aug. 22, 1961 |
| 3,015,895 | Stall | Jan. 9, 1962 |

FOREIGN PATENTS

| | | |
|---|---|---|
| 848,718 | Germany | Sept. 8, 1952 |
| 712,342 | Great Britain | July 21, 1954 |